(12) United States Patent
Wang

(10) Patent No.: US 6,791,642 B1
(45) Date of Patent: Sep. 14, 2004

(54) LIQUID CRYSTAL DISPLAY WITH A FRESNEL LENS REFLECTIVE LAYER

(75) Inventor: Po Hsien Wang, Taichung (TW)

(73) Assignee: Wintek Corporation, Taichung (TW)

( * ) Notice: Subject to any disclaimer, the term of this patent is extended or adjusted under 35 U.S.C. 154(b) by 0 days.

(21) Appl. No.: 10/417,079

(22) Filed: Apr. 17, 2003

(51) Int. Cl.[7] .................... G02F 1/1335; G02F 1/133; G02F 1/13
(52) U.S. Cl. .................... 349/113; 349/193; 349/57
(58) Field of Search .................. 349/113, 57, 193

(56) References Cited

U.S. PATENT DOCUMENTS 5,528,057 A * 6/1996 Yanagase et al. ............ 257/96
5,934,795 A * 8/1999 Rykowski et al. ........... 362/309
5,959,701 A * 9/1999 Watanabe et al. ........... 348/744

* cited by examiner

Primary Examiner—Huyen Ngo
(74) Attorney, Agent, or Firm—Rosenberg, Klein & Lee

(57) ABSTRACT

A liquid crystal display with a Fresnel lens reflective layer includes an upper transparent substrate, a lower transparent substrate and a liquid crystal layer sandwiched between the upper and lower transparent substrates. A resin layer is laid on the lower transparent substrate. The resin layer is composed of numerous units each having more than one region. The region has a Fresnel lens concentric annular structures or a part thereof. A reflective layer is laid on the resin layer. The surface of the reflective layer has the Fresnel lens structure pattern for reflecting and scattering the light so as to reduce glare, enhance brightness and lower chromatic aberration.

5 Claims, 11 Drawing Sheets

LIQUID CRYSTAL DISPLAY WITH A FRESNEL LENS REFLECTIVE LAYER

BACKGROUND OF THE INVENTION

The present invention is related to a liquid crystal display with a Fresnel lens reflective layer, in which the resin layer has a Fresnel lens with concentric annular structures such that the reflective layer is laid on the resin layer for both reflecting and scattering the light.

In a conventional reflective liquid crystal display, the external light is reflected by the reflective film of the liquid crystal display to provide necessary light source for the display. Therefore, the reflective liquid crystal display has no in-built light source so that the thickness is reduced and the power is saved. However, the quality of the image of such reflective liquid crystal display is determined by the distribution of the reflected light. According to reflection principle (as shown in FIG. 8), the angle a contained by the incident light 81 and the normal line 82 is equal to the angle b contained by the reflected light 83 and the normal line 82. Therefore, in the case of large angle of incidence, the angle of reflection will be also large. Under such circumstance, a user 84 perpendicular to the liquid crystal display can hardly see the reflected light. As a result, the brightness and comparability of such liquid crystal display are poor.

The reflective film of the conventional reflective liquid crystal display mostly employs symmetrical and periodical reflective units. However, the symmetrical reflective units cannot conduct the reflected light by a necessary angle. Also, the arrangement of the periodical reflective units will lead to problems of interference and stripes of chromatic aberration.

Referring to FIG. 9, when such reflective liquid crystal display is turned to a position with brighter light source, the light 85 reflected by the surface 80 of the display will coincide with the light 87 reflected by the reflective film 86. This will lead to glare and reduce comparability of the image.

In order to solve the above problems, an improved reflective liquid crystal display has been developed as shown in FIG. 10. In such display, a scattering layer 92 is overlaid on the upper transparent substrate 91. The scattering layer 92 includes numerous asymmetrical protuberances 921 having concentric stripes for changing the path of the incident light 93 and providing anti-glare function. However, in such reflective liquid crystal display, the scattering layer 92 is farther from the reflective layer 94 so that the problem of chromatic aberration will take place.

FIG. 11 is a cross-sectional view of another type of conventional reflective liquid crystal display, in which the lower transparent substrate 95 includes numerous sloped protuberances 96 for providing anti-glare function. In addition, each sloped protuberance 96 has multiple scattering projections 961 for scattering the light. However, such sloped protuberances 96 with scattering projections 961 necessitate two times of yellow light manufacturing procedures. This increases the cost and lowers the ratio of good products.

SUMMARY OF THE INVENTION

It is therefore a primary object of the present invention to provide a liquid crystal display with a Fresnel lens reflective layer. In the liquid crystal display, the resin layer is composed of numerous units arranged respectively corresponding to the pixels of the display. Each unit has multiple regions. Each region has a part of the concentric annular structure with a Fresnel lens pattern. The structure with a Fresnel lens pattern has asymmetrical and non-periodical structural pattern. The reflective layer is plated on the resin layer and has the same structural pattern. When the light is reflected by the reflective layer of such structure, the light is scattered and the path of the light is changed to provide anti-glare function. Moreover, in the case of large angle of incidence, the reflective layer can evenly scatter the light to achieve better brightness and comparability than the prior art. Also, the asymmetrical and non-periodical structural pattern can enhance the brightness and avoid the interference.

It is a further object of the present invention to provide the above liquid crystal display with a Fresnel lens reflective layer in which the reflective layer can both reflect and scatter the light so that the problem of chromatic aberration is solved. The liquid crystal display is made by one time of yellow light manufacturing procedure so that the cost is lowered.

According to the above objects, the liquid crystal display with a Fresnel lens reflective layer of the present invention includes an upper transparent substrate, a lower transparent substrate and a liquid crystal layer sandwiched between the upper and lower transparent substrates. One face of the liquid crystal layer adjacent to the upper transparent substrate has an upper transparent electrode, while the other face of the liquid crystal layer adjacent to the lower transparent substrate has a lower transparent electrode. Between the lower transparent substrate and the lower transparent electrode are sequentially piled a dielectric layer, a resin layer, a reflective layer and an insulating layer. The resin layer is composed of numerous units each having at least one region. The region has a part of the Fresnel lens concentric annular structure. The reflective layer is laid on the resin layer. The surface of the reflective layer has the Fresnel lens concentric annular structures for reflecting and scattering the light.

The present invention can be best understood through the following description and accompanying drawings wherein:

DETAILED DESCRIPTION OF THE PREFERRED EMBODIMENTS

Figure 1:
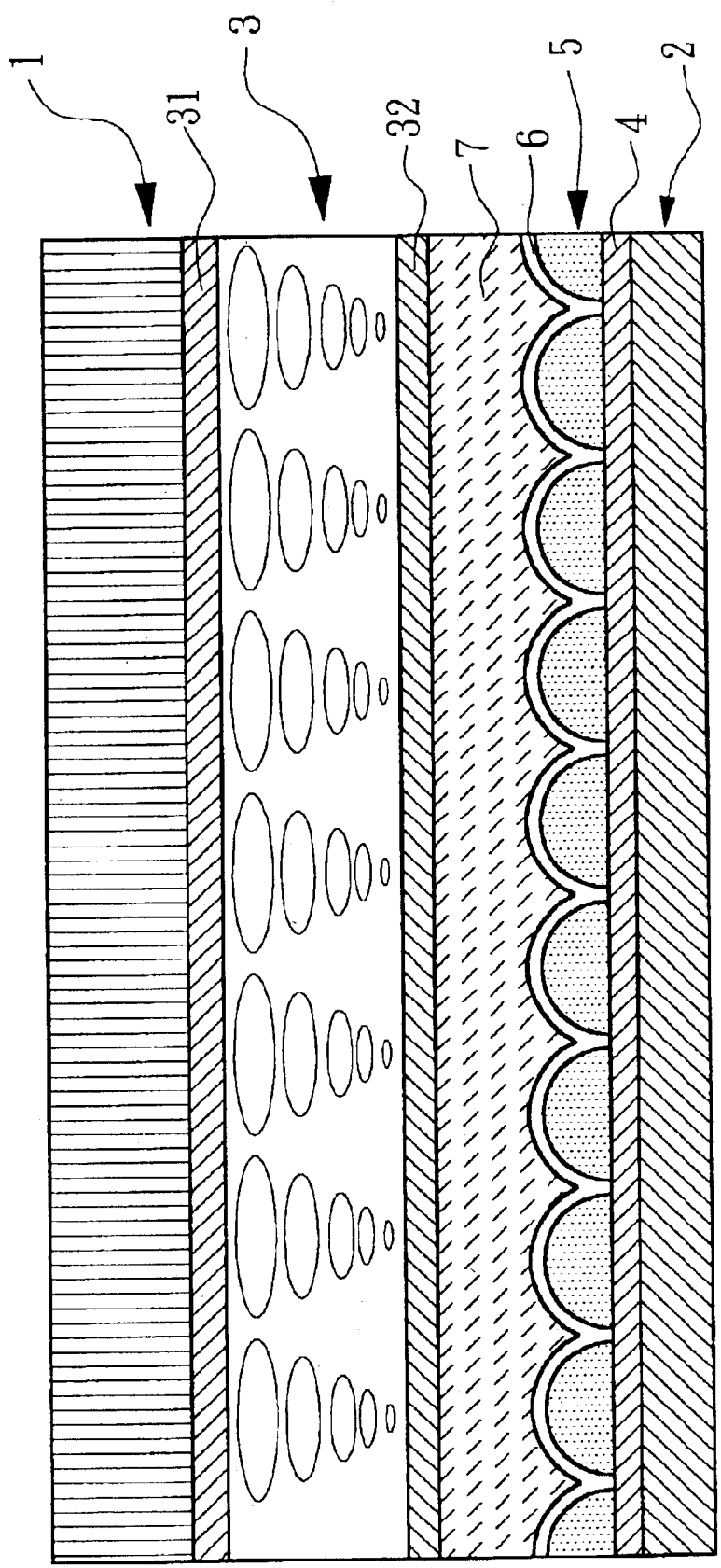
FIG. 1 is a sectional view of the structure of the liquid crystal display with a Fresnel lens reflective layer of the present invention.

Please refer to FIG. 1. The liquid crystal display with a Fresnel lens reflective layer of the present invention includes an upper transparent substrate 1, a lower transparent substrate 2 and a liquid crystal layer 3 sandwiched between the upper and lower transparent substrates. One face of the liquid crystal layer 3 adjacent to the upper transparent substrate 1 has an upper transparent electrode 31, while the other face of the liquid crystal layer 3 adjacent to the lower transparent substrate 2 has a lower transparent electrode 32.

Between the lower transparent substrate 2 and the lower transparent electrode 32 are sequentially piled a dielectric layer 4, a resin layer 5, a reflective layer 6 and an insulating layer 7.

Figure 3:
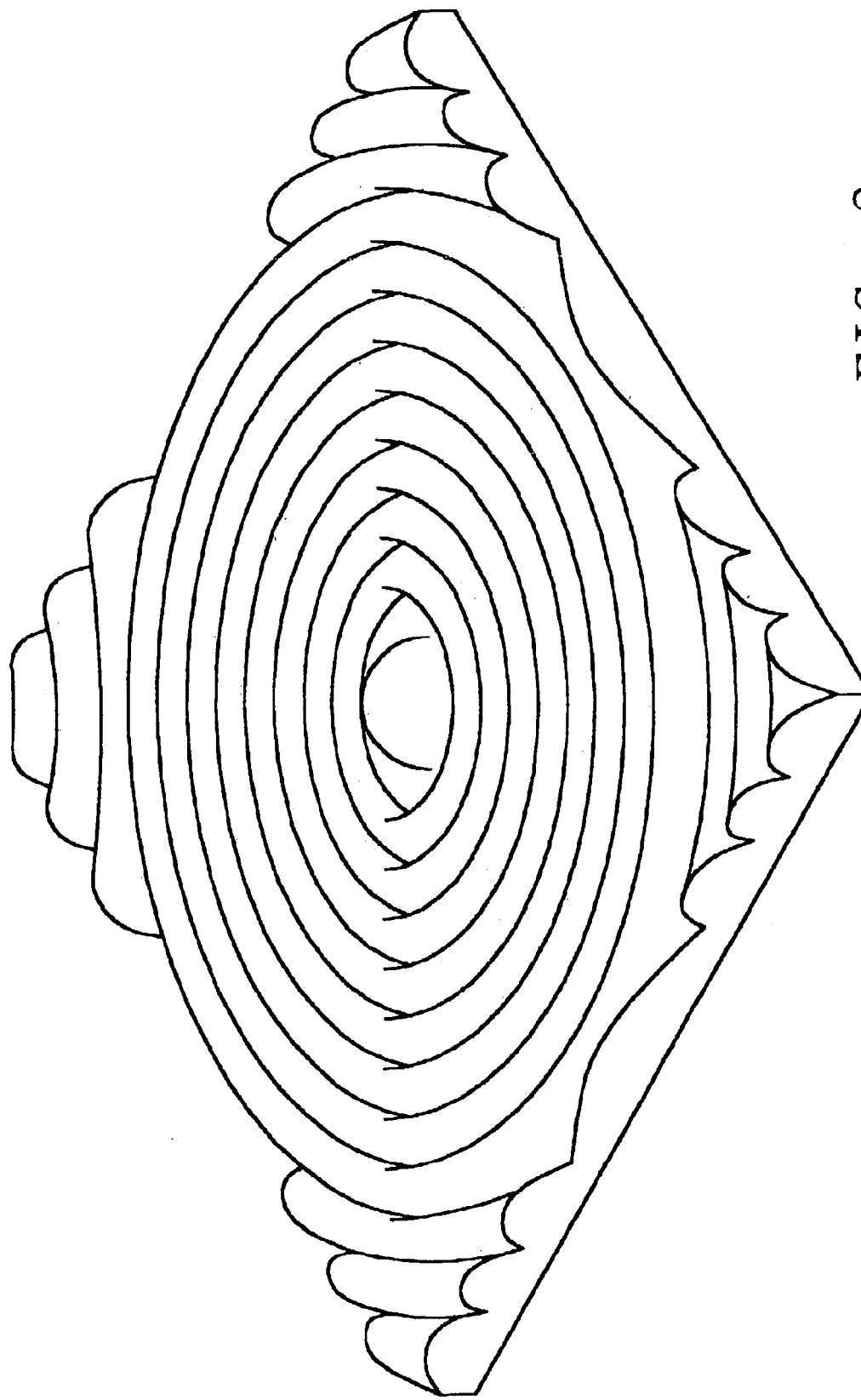
FIG. 3 shows the Fresnel lens structure of the present invention.
Figure 5:
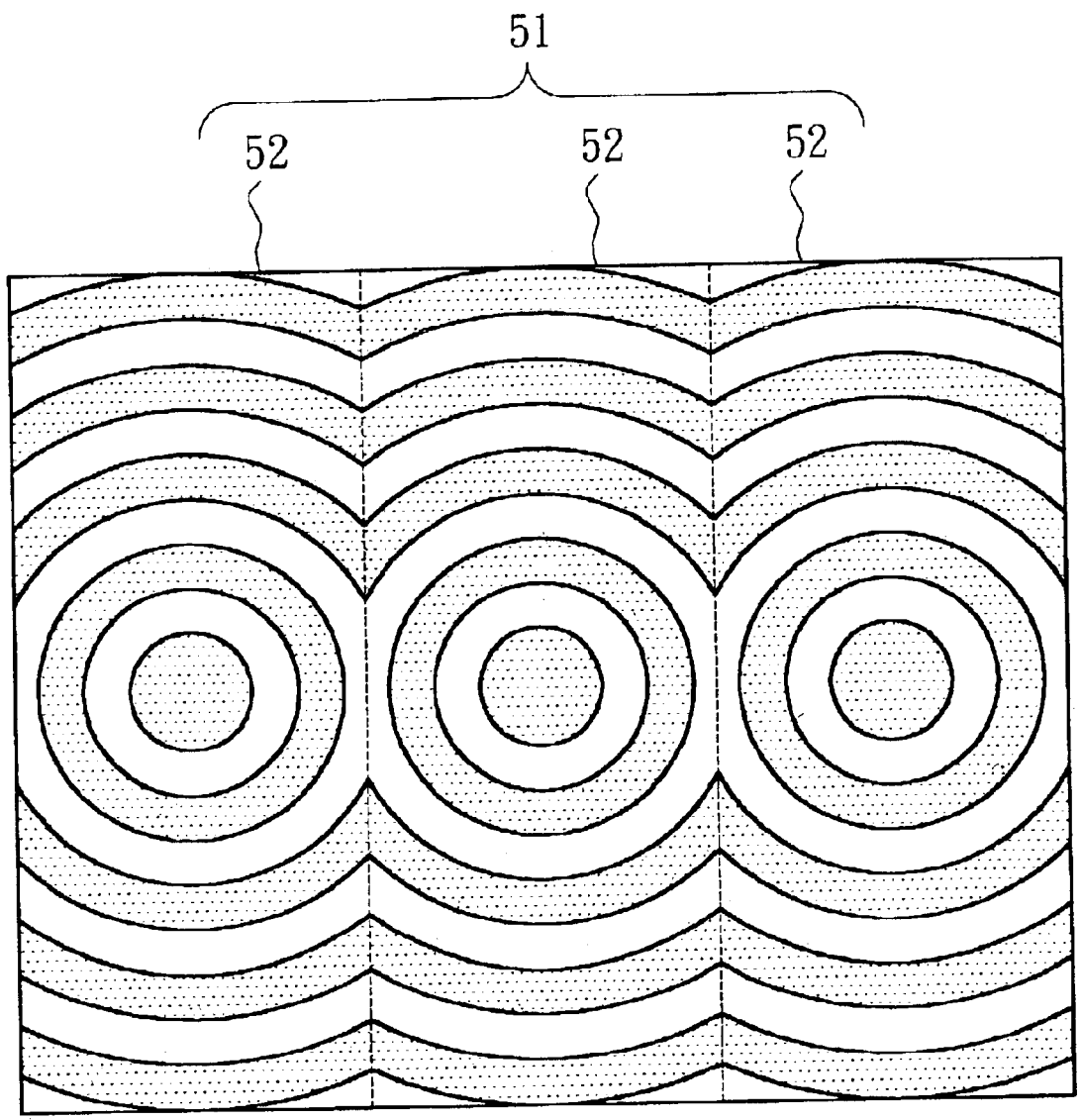
FIG. 5 shows a first embodiment of the Fresnel lens structure of the present invention.

The resin layer 5 is composed of numerous units 51 arranged corresponding to the pixels (not shown) of the liquid crystal display. In this embodiment, the resin layer 5 is made of resin material by one time of yellow light manufacturing procedure to form numerous units 51. Each unit 51 has multiple regions 52 as shown in FIG. 5. In this embodiment, the unit 51 has three regions 52. Each region 52 has the longitudinal middle sections of multiple concentric annular structures with the Fresnel lens pattern (as shown in FIG. 3). The thickness of the Fresnel lens concentric annular structures of the region 52 is within 5%~18% of the width of the annular pattern. Accordingly, the respective units 51 of the resin layer 5 will form a complex structure with a Fresnel lens pattern.

In this embodiment, the dielectric layer 4 is formed of inorganic oxide such as Si oxide or Ti oxide to provide dielectric effect. The material of the reflective layer 6 is metal conductive material mainly including silver and aluminum for providing reflective effect. The material of the insulating layer 7 can be dielectric film or resin film for providing insulating effect.

Figure 4:
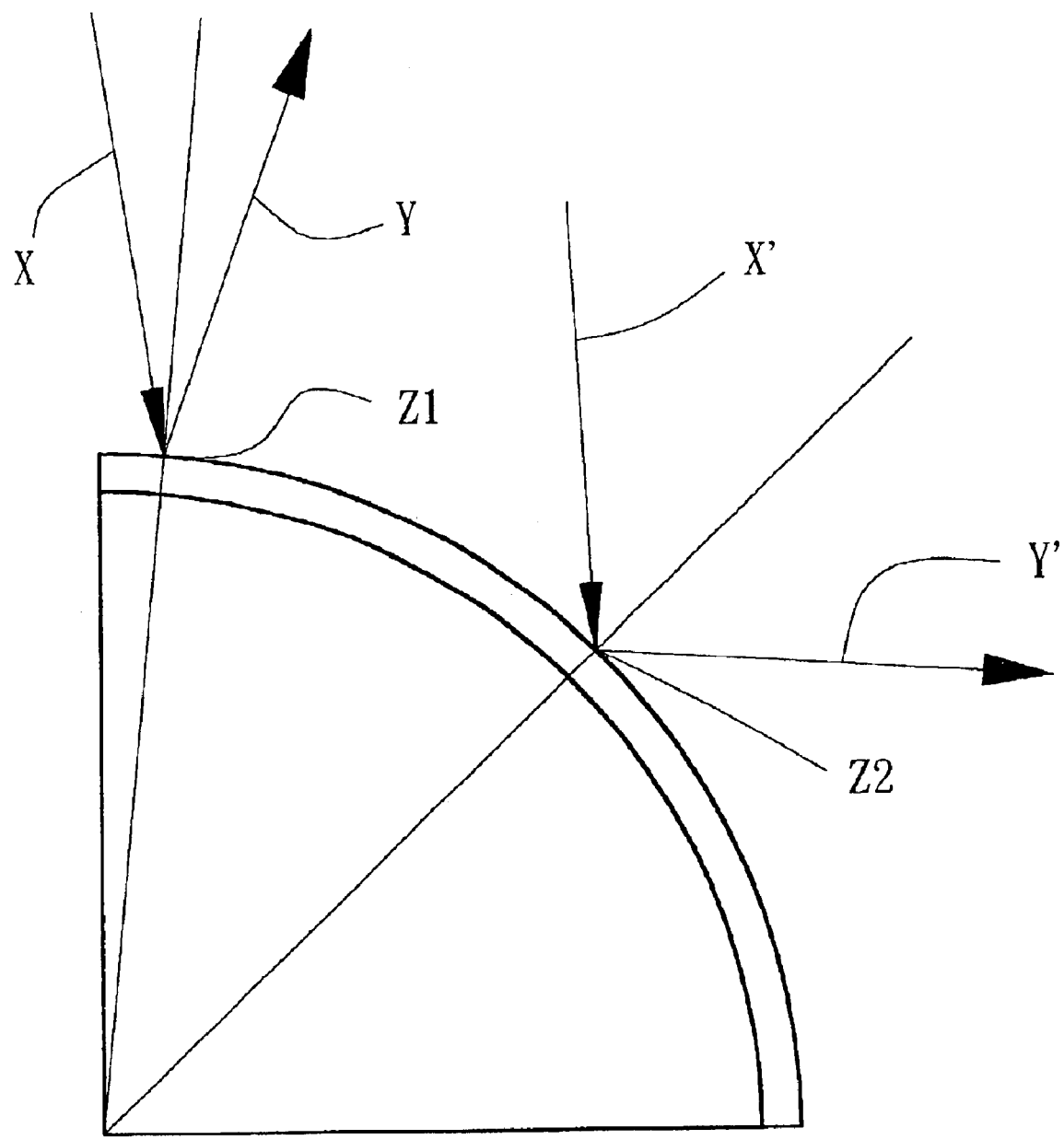
FIG. 4 shows the light path of the Fresnel lens structure of the present invention.

The structure with the Fresnel lens pattern as shown in FIG. 3 was originally widely applied to optical lens as a plane magnifier. It is found by the applicant that when the structure with the Fresnel lens pattern is used for reflection, a scattering effect is created. FIG. 4 shows the reflection of light by the surface of the structure with the Fresnel lens pattern. For clear illustration, only a part of the annular structure with the Fresnel lens pattern is shown. According to the principle of reflection, when the incident light X is projected to the position Z1 of the surface of the annular structure, a reflected light Y is produced. When an incident light X' with the same angle is projected to the position Z2 of the surface of the annular structure, a reflected light Y' is produced. Accordingly, when the incident light beams X, X' with the same angle are projected to different positions Z1, Z2 of the surface of the annular structure, different angles of reflected light beams Y, Y' are produced. That is, the surface of the structure with the Fresnel lens pattern is able to scatter light.

Accordingly, the surfaces of the concentric annular structures with the Fresnel lens pattern can scatter the light. Such optical characteristic is such utilized that the resin layer is designed into a structure with the Fresnel lens pattern and a reflective layer is plated on the resin layer. Therefore, the reflective layer has the surface with the Fresnel lens pattern. This is applied to the liquid crystal display. The reflective layer is made of metal material and is able to reflect light. In addition, the surface of the concentric annular structures with the Fresnel lens pattern can scatter the light. Accordingly, one single reflective layer can have both reflection and scattering functions to provide anti-glare effect. In addition, the reflective layer has both reflection and scattering functions so that it is unnecessary to respectively dispose the scattering layer and reflective layer as in the prior art. Therefore, the problem of chromatic aberration is eliminated and the cost is lowered.

Figure 2:
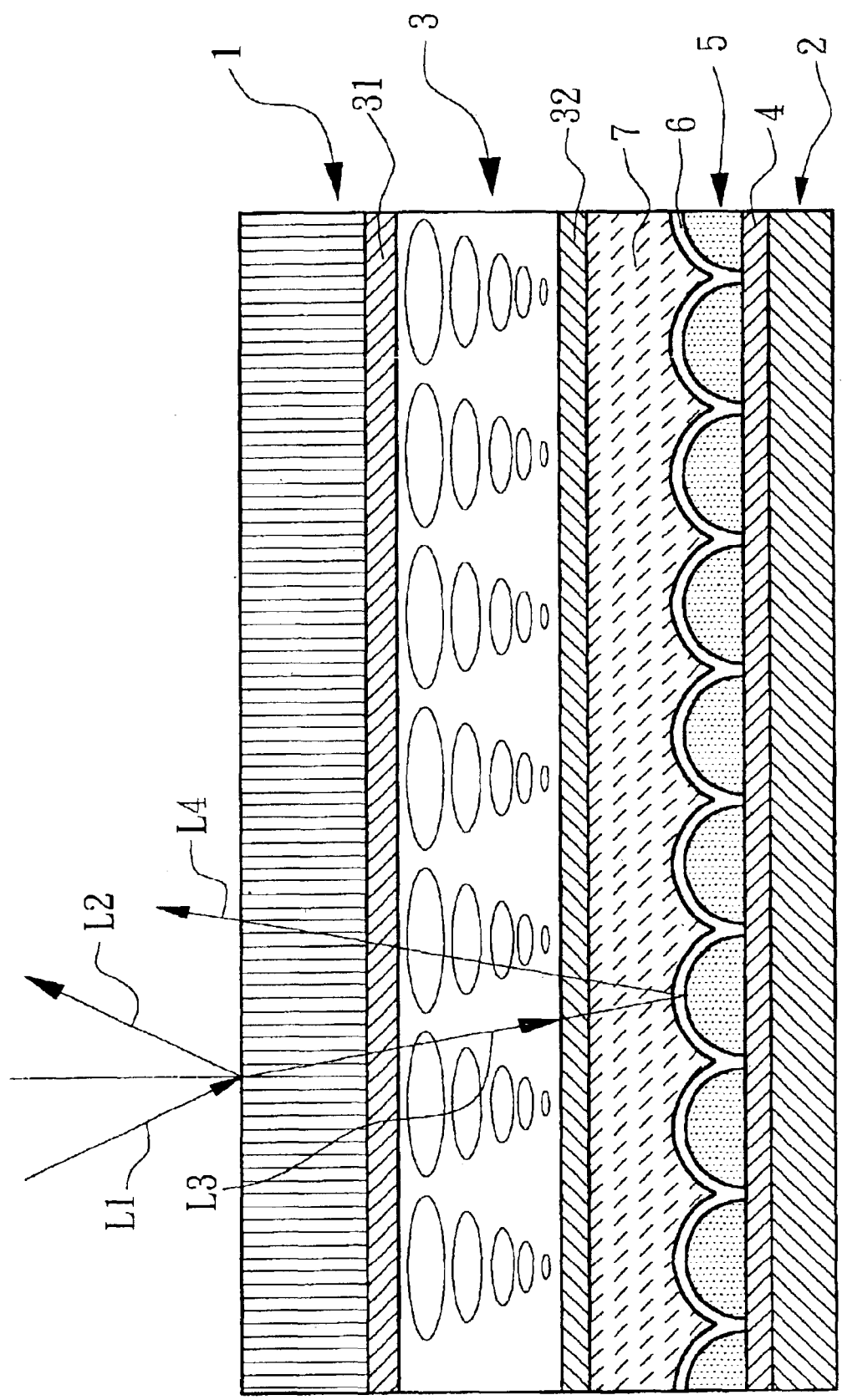
FIG. 2 is a view according to FIG. 1, showing the light path of the liquid crystal display with a Fresnel lens reflective layer of the present invention.

In actual use of the present invention, as shown in FIG. 2, when the incident light L1 is projected to the surface of the upper transparent substrate 1, a reflected light L2 is produced. A part of the incident light L1 is refracted to form a refracted light L3 passing through the upper transparent substrate 1, the upper transparent electrode 31 and the liquid crystal layer 3. Then the refracted light L3 is reflected by the surface of the reflective layer 6 with the Fresnel lens pattern to create a reflected light L4. The reflective layer 6 is able to scatter the light so that the first reflected light L2 and the second reflected light L4 have different directions. Accordingly, the glare is avoided. Moreover, in the case of large angle of incidence, the reflective layer 6 can evenly scatter the light to achieve better brightness and comparability.

Furthermore, the respective units 51 of the present invention corresponding to the pixels of the liquid crystal display are a complex structure with the Fresnel lens pattern having asymmetrical and non-periodical structural pattern. Therefore, the brightness is enhanced and the interference is avoided.

In conclusion, the resin layer 5 is composed of numerous units 51. Each unit 51 has multiple regions 52. Each region 52 has a part of the concentric annular structure with the Fresnel lens pattern. The structure with the Fresnel lens pattern has asymmetrical and non-periodical structural pattern. The reflective layer 6 plated on the resin layer 5 has the same structural pattern. When the light is reflected by the reflective layer 6 of such structure, the light is scattered and the path of the light is changed to provide anti-glare function. Moreover, in the case of large angle of incidence, the reflective layer 6 can evenly scatter the light to achieve better brightness and comparability than the prior art. Also, the asymmetrical and non-periodical structural pattern can enhance the brightness and avoid the interference. Furthermore, the resin layer 5 of the present invention is made by one time of yellow light manufacturing procedure so that the cost is lowered.

Figure 6:
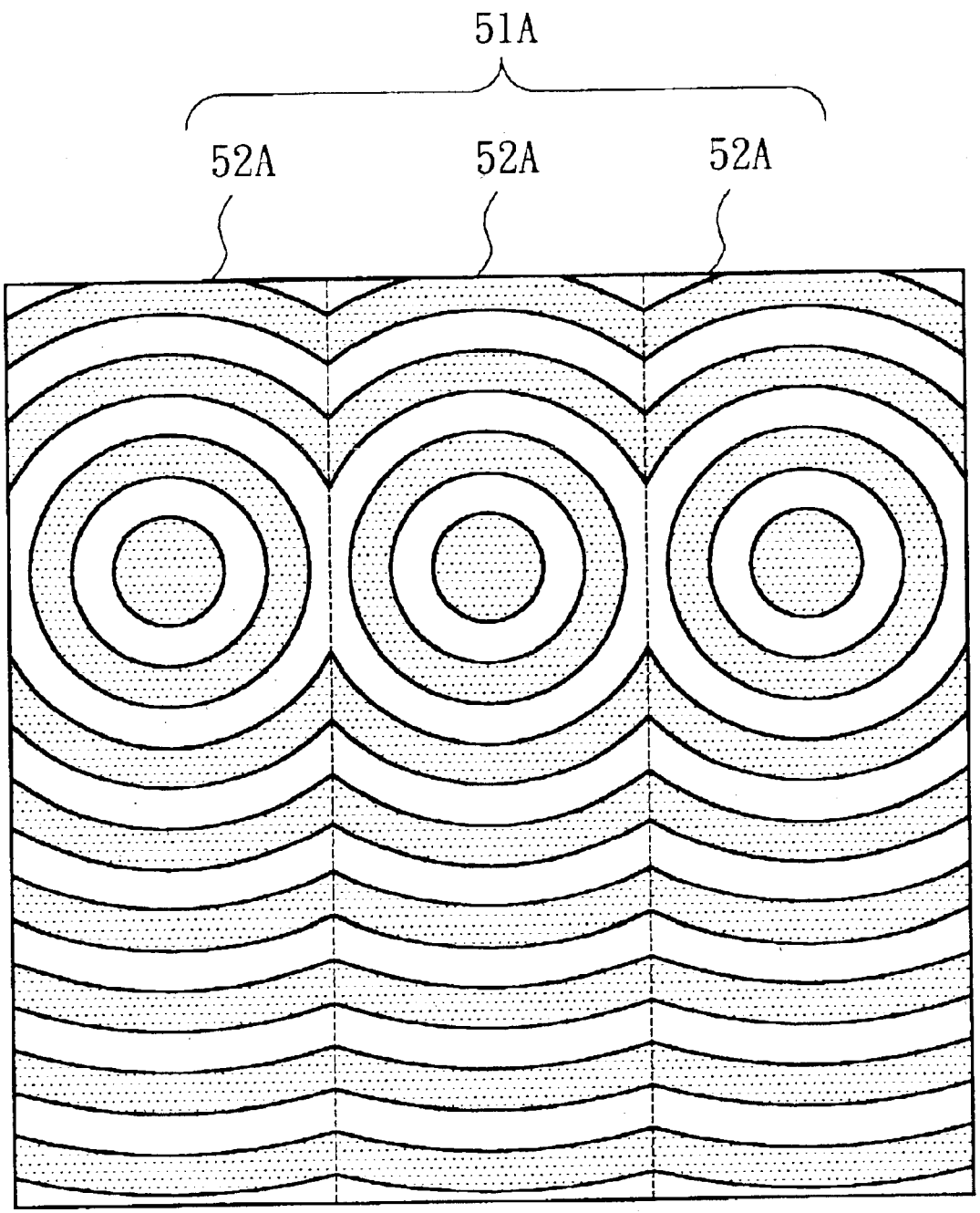
FIG. 6 shows a second embodiment of the Fresnel lens structure of the present invention.

FIG. 6 shows a second embodiment of the present invention, in which the unit 51A has three regions 52A. Each region 52A has the longitudinal middle sections of the Fresnel lens structures. Moreover, the Fresnel lens concentric annular structures are eccentrically arranged to form the unit 51A as shown in FIG. 6. This can achieve the same effect as the first embodiment.

Figure 7:
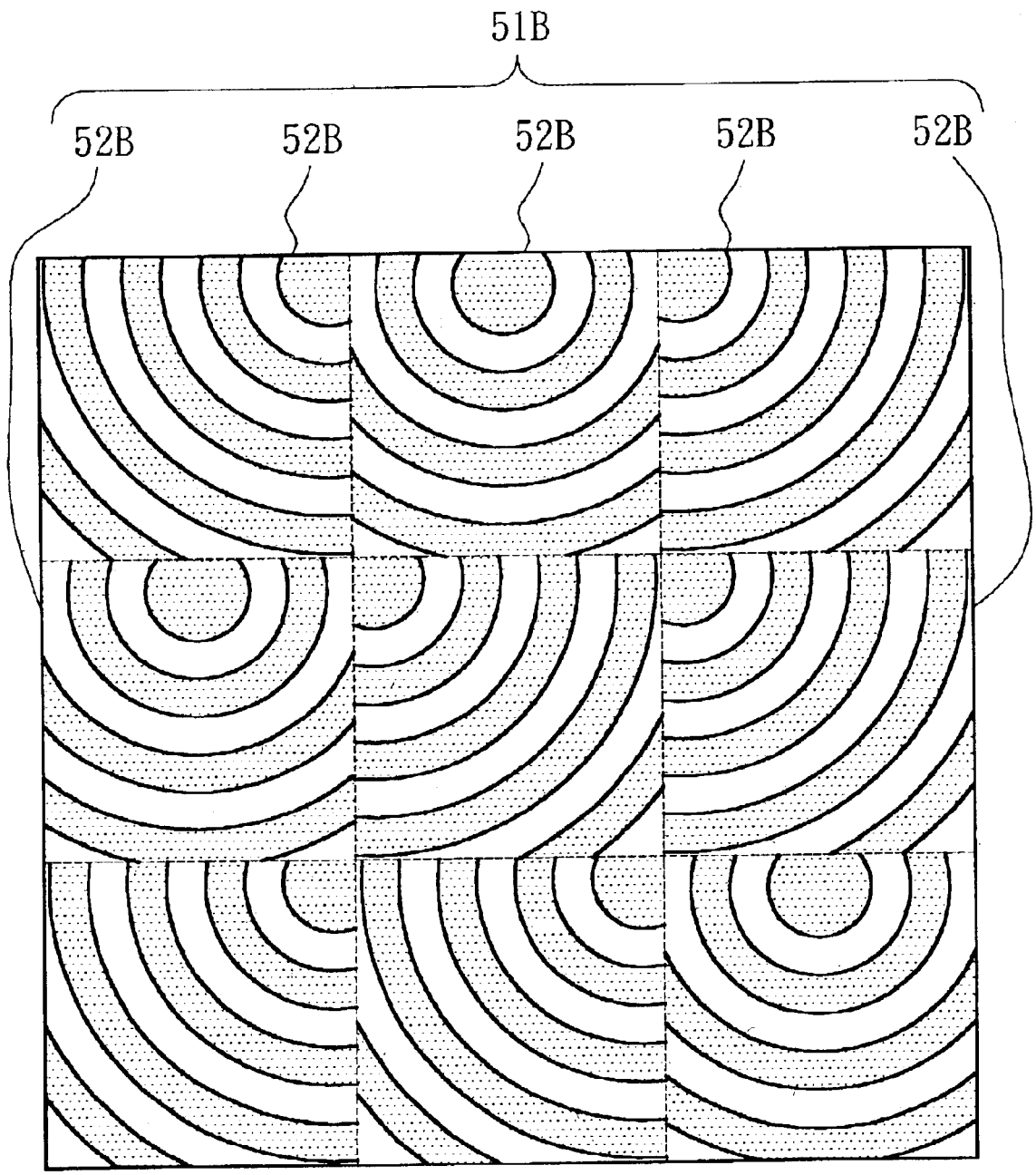
FIG. 7 shows a third embodiment of the Fresnel lens structure of the present invention.
Figure 8:
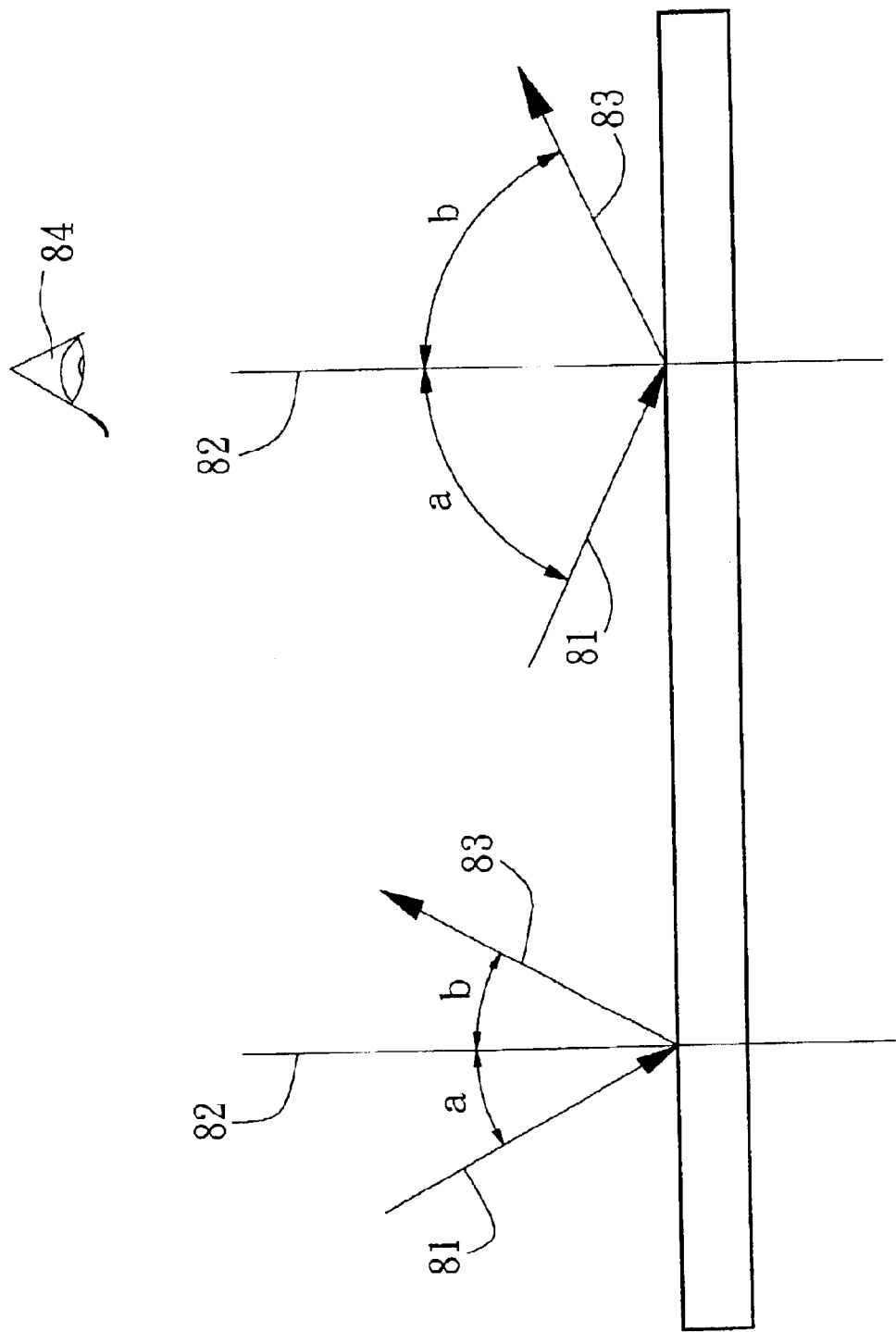
FIG. 8 shows the principle of reflection.
Figure 9:
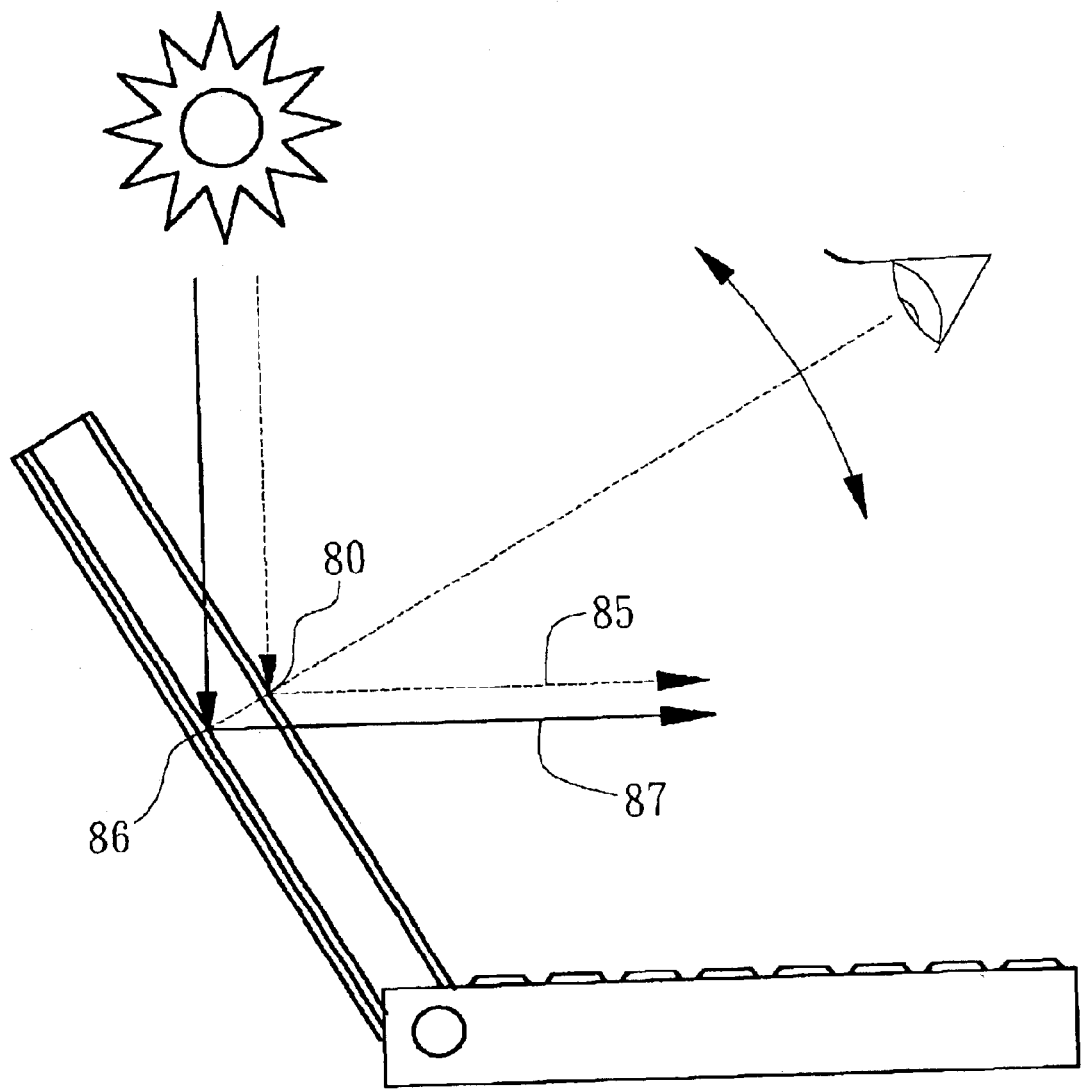
FIG. 9 shows that the external light is reflected by a conventional reflective liquid crystal display.
Figure 10:
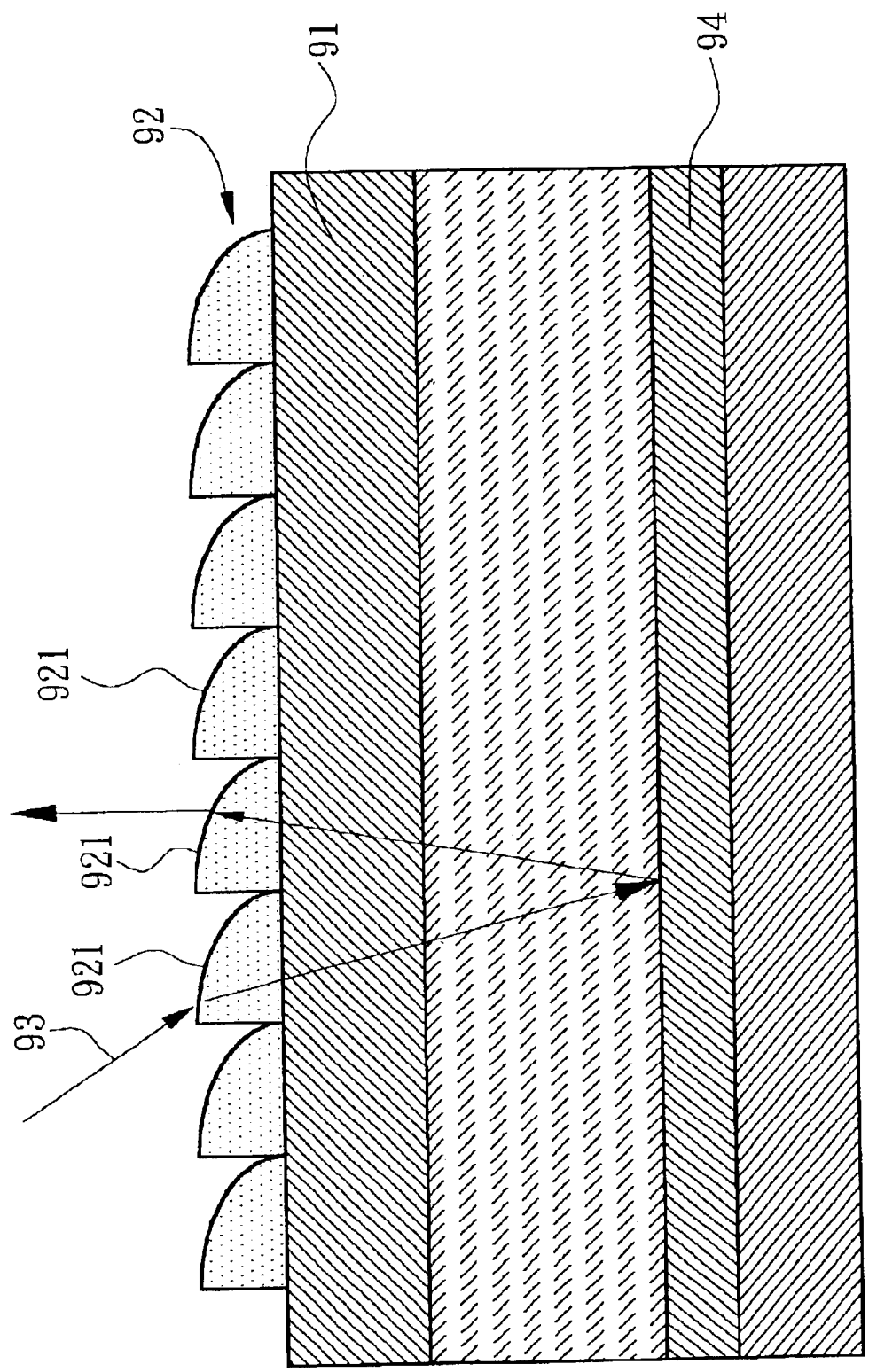
FIG. 10 is a sectional view of a conventional reflective liquid crystal display.
Figure 11:
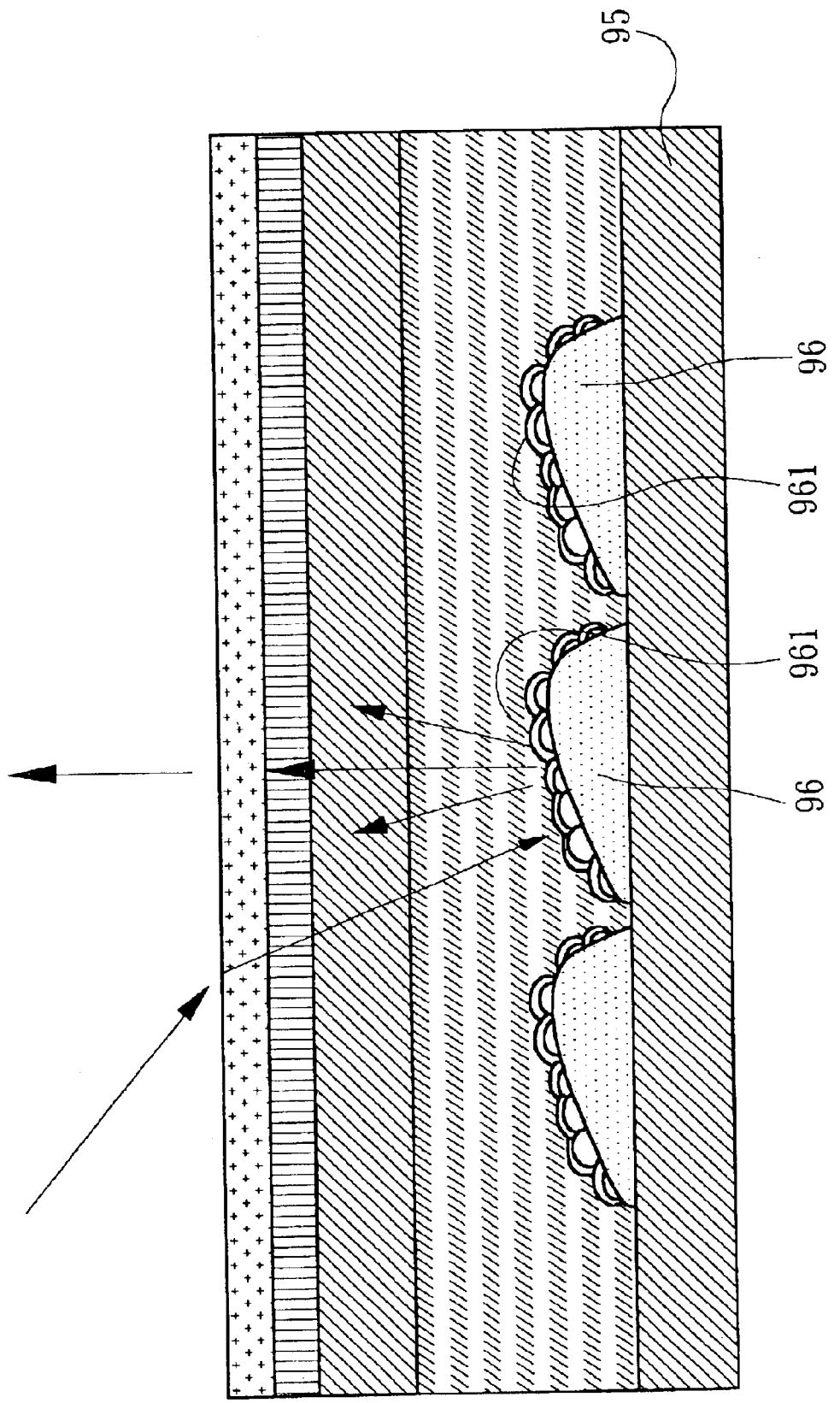
FIG. 11 is a sectional view of another type of conventional reflective liquid crystal display.

FIG. 7 shows a third embodiment of the present invention, in which the unit 51B has nine regions 52B. Each region 52B has any section of the Fresnel lens structure to form the unit 51B. This can achieve the same effect as the first embodiment. Moreover, the third embodiment has better non-periodical and asymmetrical characteristic so that the interference of light is greatly reduced.

The above embodiments are only used to illustrate the present invention, not intended to limit the scope thereof. Many modifications of the above embodiments can be made without departing from the spirit of the present invention.

What is claimed is:

1. A liquid crystal display with a Fresnel lens reflective layer, comprising an upper transparent substrate, a lower transparent substrate and a liquid crystal layer sandwiched between the upper and lower transparent substrates, one face of the liquid crystal layer adjacent to the upper transparent substrate having an upper transparent electrode, while the other face of the liquid crystal layer adjacent to the lower transparent substrate having a lower transparent electrode, between the lower transparent substrate and the lower transparent electrode being sequentially piled a dielectric layer, a resin layer, a reflective layer and an insulating layer, the resin layer being composed of numerous units arranged respectively corresponding to pixels of the liquid crystal display, each unit having multiple regions, each of said regions having a Fresnel lens pattern of concentric annular structures for reflecting and scattering incident light.

2. The liquid crystal display with a Fresnel lens reflective layer as claimed in claim 1, wherein each of said regions has any section of the Fresnel lens pattern of concentric annular structure, whereby the units of the resin layer form a complex structure with the Fresnel lens pattern.

3. The liquid crystal display with a Fresnel lens reflective layer as claimed in claim 1, wherein the material of the reflective layer is metal conductive material mainly including silver and aluminum.

4. The liquid crystal display with a Fresnel lens reflective layer as claimed in claim 1, wherein the dielectric layer is a dielectric film formed of inorganic oxide such as Si oxide or Ti oxide.

5. The liquid crystal display with a Fresnel lens reflective layer as claimed in claim 1, wherein the material of the insulating layer is dielectric film or resin film.

* * * * *